Patented Oct. 9, 1923.

1,470,422

UNITED STATES PATENT OFFICE.

GEORGE G. BOWLUS, OF BURKITTSVILLE, MARYLAND.

SALVE OR OINTMENT.

No Drawing.     Application filed November 16, 1921. Serial No. 515,567.

*To all whom it may concern:*

Be it known that GEORGE G. BOWLUS, citizen of the United States, residing at Burkittsville, in the county of Frederick and State of Maryland, has invented certain new and useful Improvements in Salves or Ointments, of which the following is a specification.

The present invention relates to salves or ointments and consists in the combination of ingredients and method of compounding the same hereinafter described and particularly set forth in the accompanying claims.

The invention has for its purpose to provide a salve or ointment having the necessary ingredients for curing or giving relief from boils, carbuncles, blue blisters, white swelling, chronic sores, cuts, burns, bone-fellon and blood-poison; and is adapted to be externally applied by rubbing the same on the part of the body affected with a cloth or the like. In this application the salve is spread on the rag or cloth to about the thickness of one-sixteenth of an inch.

The salve or ointment is composed of the following ingredients by weight:

A basic lead compound, preferably red lead, 16%.

A vegetable oil, preferably linseed oil, 64%.

An essential oil, preferably turpentine, 16%, together with gum camphor 4%.

More or less variations or substitution, within the scope of the appended claims can be made, but the specific substances mentioned are found to give the most satisfactory results. The proportions, of course, can be varied to some extent, depending on the particular results desired. This salve is prepared by mixing the five ingredients together in a kettle and heating the mixture to a temperature in the vicinity of 212° Fah. and holding at that temperature for a period of about three hours, or longer; then placing in jars or other receptacles for distribution.

In lieu of the ingredients and their respective proportions above set forth, the following may be used:

A basic lead compound, preferably red lead, 15%.

A vegetable oil, preferably linseed oil, 64%.

An essential oil, preferably turpentine, 16%, together with gum camphor, 4%, and a healing substance e. g. verdigris (copper acetate) 1%.

Verdigris (copper acetate) is used because it changes the color of the salve from black to brown, but more especially because of its tendency to shrink or draw together the edges of a cut or break in the skin. It has also a quality which promotes granulation on the exposed surface of a cut.

Having thus described my invention what I claim as new and desire to secure by Letters Patent is:

1. A salve or ointment comprising red lead, linseed oil and verdigris, turpentine and camphor, substantially as set forth.

2. A salve or ointment comprising the following ingredients by weight, red lead 15%, linseed oil 64%, turpentine 16%, verdigris 1%, and camphor 4%, substantially as set forth.

In testimony whereof I affix my signature.

GEORGE G. BOWLUS.